US005715596A

United States Patent [19]

Bintz

[11] Patent Number: 5,715,596

[45] Date of Patent: Feb. 10, 1998

[54] BRUSH SEAL FOR STATOR OF A GAS TURBINE ENGINE CASE

[75] Inventor: Matthew E. Bintz, Stuart, Fla.

[73] Assignee: United Technologies Corporation, Hartford, Conn.

[21] Appl. No.: 781,314

[22] Filed: Jan. 9, 1997

Related U.S. Application Data

[62] Division of Ser. No. 565,601, Nov. 30, 1995, Pat. No. 5,639,211.

[51] Int. Cl.[6] .......... B23P 15/00

[52] U.S. Cl. .......... 29/888.02; 29/889.2

[58] Field of Search .......... 29/888.02, 889.2, 29/428; 415/173.7, 174.2

[56] References Cited

U.S. PATENT DOCUMENTS 4,820,119 4/1989 Joyce .

4,897,021 1/1990 Chaplin et al. .

5,114,159 5/1992 Baird et al. .

5,346,362 9/1994 Bonner et al. .

*Primary Examiner*—Irene Cuda

*Attorney, Agent, or Firm*—Norman Friedland

[57] ABSTRACT

The inner shroud removably fitted to the foot of the vanes in the stator of the compressor section of a gas turbine engine is designed to support a radial brush seal for sealing the adjacent rotor from the engines's hot gases adjacent the foot of the vanes. The shroud supports a spring damper and this assembly relative to the foot of the stator is critically dimensioned so that the hooks formed in the foot of the stator and in the shroud allow the shroud assembly to be positioned radially and moved axially to be locked into place. A retainer ring circumferentially fitted into the shroud holds the assembly. This allows for easy installation and removal.

5 Claims, 2 Drawing Sheets

BRUSH SEAL FOR STATOR OF A GAS TURBINE ENGINE CASE

This is a division of application Ser. No. 08/565,601 filed on Nov. 30, 1995, now U.S. Pat. No. 5,639,211.

This invention was made under a United States Government contract and the Government has an interest herein.

CROSS REFERENCE

The subject matter of this invention relates to the subject matter disclosed in U.S. Pat. No. 5,346,362 granted to Bonner et al on Sep. 13, 1994 entitled "Mechanical Damper" and commonly assigned to United Technologies Corporation.

TECHNICAL FIELD

This invention relates to brush seal with damper and more particularly for a brush seal and damper assembly for a compressor case of a gas turbine engine and the method of axially assembling the unit.

BACKGROUND ART

This invention constitutes an improvement over the structure disclosed in U.S. Pat. No. 5,346,362, supra in that it utilizes brush seals instead of labyrinth seals for the stator of a gas turbine engine and is specifically designed for a compressor case. While the present invention and the structure in the U.S. Pat. No. 5,346,362 can be utilized in either a split or non-split case, the present invention is particularly efficacious in a split case assembly. As one skilled in this art will appreciate the assembly of dampers on a non-split case as of the type disclosed in the U.S. Pat. No. 5,346,362 is difficult and time consuming. In the heretofore known designs, the seal and damper are slipped onto the stator circumferentially while the spring damper is compressed. This process is difficult due to the frictional forces between the spring and the stator and many times the stator is sectioned between vanes causing the spring to bind at assembly.

The purpose of this invention is to obviate this problem by incorporating the spring and the brush seal into the stator shroud judiciously modified so that as a sub-assembly it can be axially installed into the foot of the stator of the stator vane assembly. In the event the invention is utilized in a full hoop case, the modified shroud made in accordance with this invention would be installed on stator packs prior to being assembled into the case and the stator assembly including the shroud would be installed into the compressor case.

In the event the invention is employed in a split case the spring damper and brush seal can be assembled directly in the case.

In either scenario, this invention facilitates the assembly process and reduces the time and cost thereof.

SUMMARY OF THE INVENTION

An object of this invention is to provide an improved damper and brush seal for the stator of a compressor.

A feature of this invention is to dimension the shroud of the stator assembly so that the spring damper and brush seal can be axially installed on the foot of the stator vane assembly. This installation process is simpler, less expensive, and faster than heretofore known installations. The invention can be employed with a full ring case or split case.

The foregoing and other features of the present invention will become more apparent from the following description and accompanying drawings.

DETAILED DESCRIPTION OF THE PREFERRED EMBODIMENT

As this invention relates to the subject matter disclosed in U.S. Pat. No. 5,346,342 for the sake of convenience and simplicity, the details are omitted from this description and for further details reference should be made to this patent which is incorporated herein by reference. Suffice it to say that this invention has particular utility in the stator of the compressor section of a gas turbine engine. Typically the stator including the vanes is formed in segments and the segments are dimensioned so that the parting plane is in coincidence with the parting plane of the split case. While this invention is being described in the preferred embodiment as being utilized in a split case, as one skilled in the art will appreciate, it can also be employed in a full ring case. However, in the full ring case the stators must be segmented and the spring damper and brush seal configuration of this invention must be first attached to the segmented stator pack prior to being installed in the full ring case.

Figure 3:
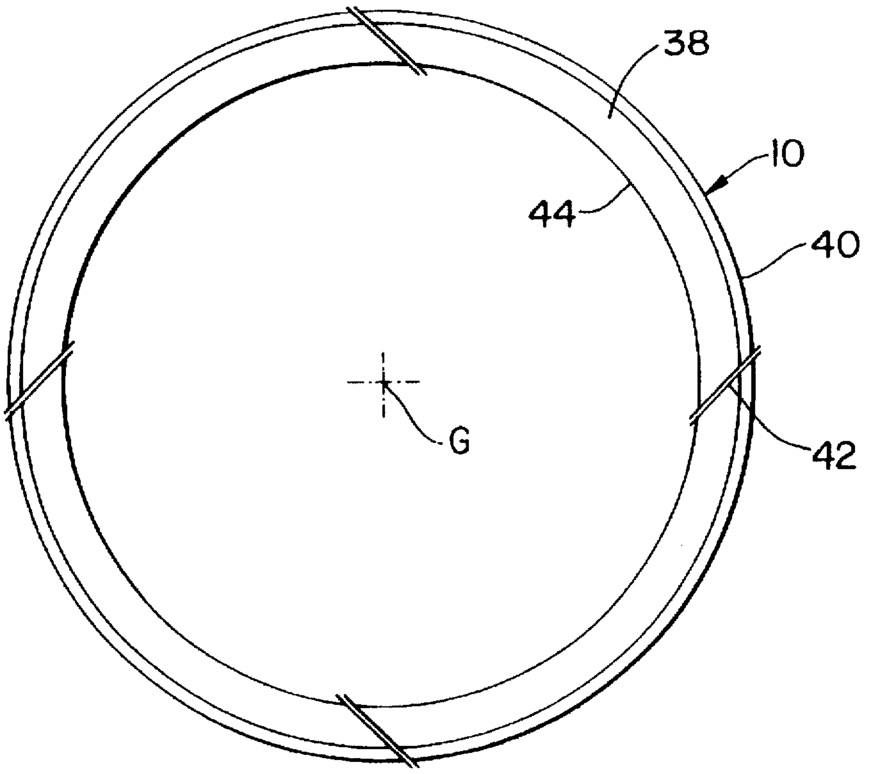
FIG. 3 is view in elevation showing the segmented brush seal.

As best seen in all the Figures the brush seal generally indicated by reference numeral 10 and spring damper 12 are shown mounted in shroud 14. The shroud which is segmented circumscribes the foot 16 of stator 18. Stator 18 contains a plurality of circumferentially spaced vanes 20 having a leading edge 21 and trailing edge 23 which serve to direct the engine air to the rotor of the compressor in a well known manner. The shroud 14 carries at its forward end the male hook 22 that fits into the female hook 24 carried by the extending portion 26 extending radially toward the center line A of the engine (not shown) from foot 16. The male hook portion 28 formed on the end of the extending portion 30 extending radially toward the center line A from the foot 16 fits into the female hook 32 formed in the aft end of shroud 14. As will be described herein below the brush seal is formed by the side surface 34 by shroud 14 and the suitable wire brushes or bristles extending approximately 45 degrees to the radial direction to engage the rotating surface of shaft or rotor 36 that rotates about the engine axis G. The shroud assembly consisting of all of the segments forming a ring is fastened into place by the split retainer ring 32. As noted in the preferred embodiment disclosed in FIGS. 3 and 4 the brush seal is segmented into four (4) segments 38 and are aligned end to end to form a ring. It will be appreciated that the number of segments will be predicated on the particular application where this invention is utilized. The ends of each of the retainers 40 in each of the segments 38 of the brush seal 10 may be chamfered as indicated by reference numeral 42 so as not to get hung up between vanes.

Figure 2:
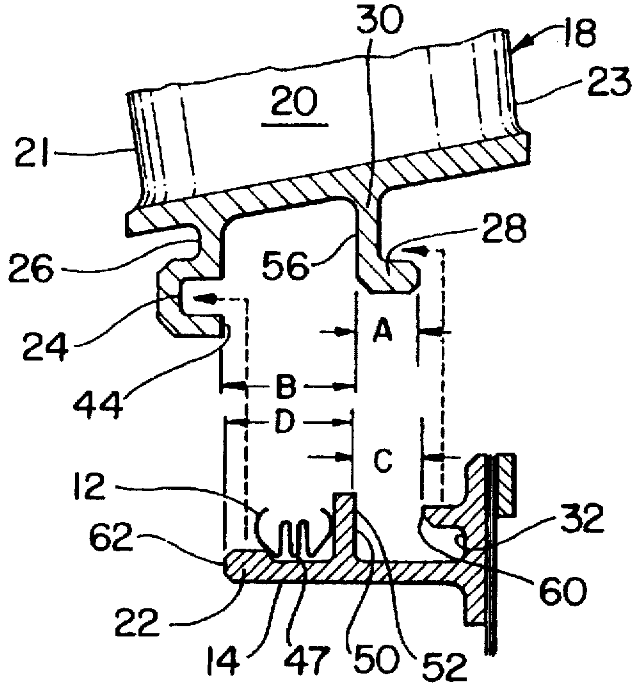
FIG. 2 is an exploded partial view in section illustrating the details of the invention and the process for assembling.
Figure 4:
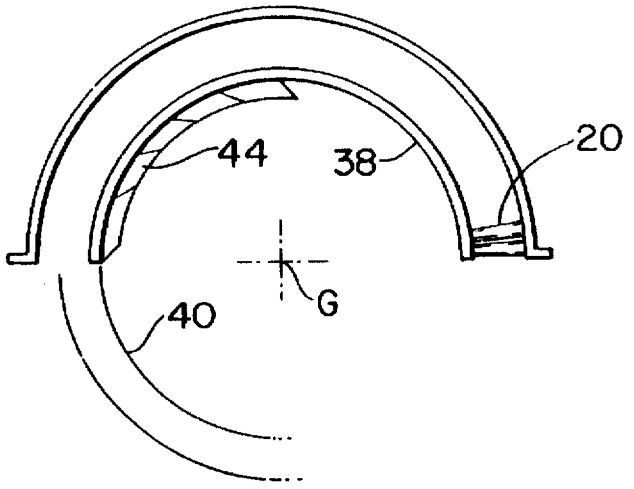
FIG. 4 is a partial view in schematic illustrating the invention installed in a split case.

As best seen in FIG. 2 and 4 the brush seal 10 consists of bundles of bristles 44 that are affixed to the retainer 40 and extend in an angle relative to the normal plane so as to contact the surface of the shaft or rotor on a bias for good sealing characteristics. The bundle of bristles 44 are affixed to retainer 40 by any suitable means such as welding or brazing. The arcuate segments 38 as shown in FIG. 4 slide into position when the shroud assembly consisting of the spring damper 48 which is of the type described in U.S. Pat. No. 5,346,362, supra.

Figure 1:
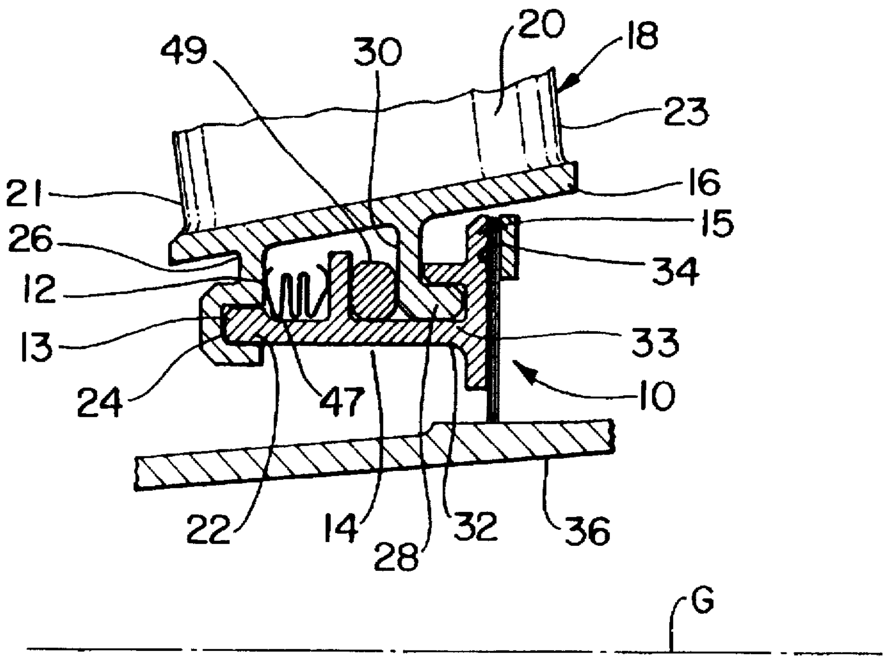
FIG. 1 is a partial view in section illustrating the invention in the assembled position.
Figure 5:
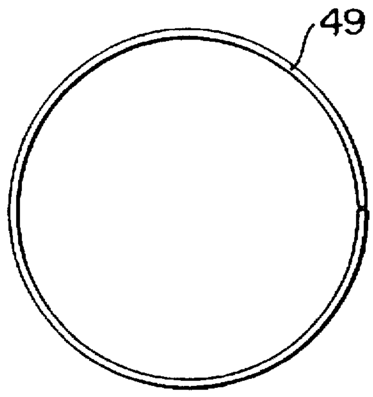
FIG. 5 is a plan view of the split retaining ring.

As mentioned earlier, one aspect of this invention is that it is easy to assemble and is assembled by positioning the shroud axially once the shroud is aligned with the hook portions. As noted in FIG. 2 the spring damper 48 is previously compressed and held between the shoulder 47 and the extending member 14 and forms part of the segmented shroud assembly. With the segmented shroud assembly in position the split ring retainer 49 (FIGS. 1 and 5) slides into the annular groove defined by the aft side of member 14 and the forward side of extending portion 30.

As is apparent from the foregoing, it is abundantly important that the shroud with respect to the hook portions are discretely dimensioned. As noted in FIG. 2 the dimensions that are critical are 1) the aft end of male hook 28 relative to forward face 56 of the extending portion 30 (A); 2) the forward end 60 of female hook 32 and the aft face 50 of the radially outward projection 52 (C); 3) The forward end 62 of male hook 22 and the aft face 50 of extension 52 (D) and 4) the aft end 64 of female hook 24 and the forward end 56 of extension 30. These dimensions are selected so that dimension A is less than dimension C and dimension D is less than dimension B. Hence, when the shroud is positioned to be aligned with the hook members, the shroud assembly is moved axially forward to fit the male hook members 22 and 28 into the female hook members 24 and 32, respectively. It will also be appreciated that by pushing the brush seal 10 leftwardly until it bottoms on the forward support of extension 30, a loose fit of size E can be attained on the retainer thus allowing a simple assembly. What has been found in actual practice is that this invention inherently avoids damage to the brush seal during the assembly process. As one skilled in this art will appreciate, the assembly of the honeycomb type of seal of the type disclosed in U.S. Pat. No. 5,346,352 has had experienced damage during the assembly process.

As is apparent from the foregoing, the assembly as depicted above provides for friction damping of the stators. While friction dampers are well known and particularly the type of damper disclosed in the U.S. Pat. No. 5,346,362 supra, it is unique to include a brush seal in this combination. Also this invention removes undesirable weld stresses from the weld joints that have plagued other heretofore known designs. This obviously reduces the risk of failure of this design.

Although this invention has been shown and described with respect to detailed embodiments thereof, it will be appreciated and understood by those skilled in the art that various changes in form and detail thereof may be made without departing from the spirit and scope of the claimed invention.

I claim:

1. The method of construction and assembly of a stator, spring damper and brush seal combination for the compressor of a gas turbine engine, including the steps of;
   - machining or casting the stator with a female hook and an axially spaced male hook extending from the inner diameter,
   - machining or casting a shroud with a female hook and an axially spaced male hook and dimensioned such that the male hook of the shroud fits into the female hook of the stator and the male hook of the stator fits into the female hook of the shroud and an upstanding member between the male hook and female hook,
   - welding a bundle of bristles to a retainer ring to form a portion of a brush seal,
   - abutting that portion of the brush seal at the rear face of the female hook of the shroud to form the remaining portion of the brush seal,
   - providing a spring damper sized to circumscribe the shroud,
   - assembling the brush seal and spring damper in said shroud; and
   - assembling said assembled shroud into said stator by aligning the female hooks with the male hooks and positioning said assembled shroud axially for the male hooks to fit into the female hooks.
2. The method of claim 1 including the additional steps of;
   - providing a split ring retainer sized to circumscribe the shroud,
   - assembling the split ring retainer after the last step of assembling the shroud by sliding the split ring over the shroud between the upstanding member and female hook of the shroud.
3. The method of claim 1 including the step of providing the brush seal in arcuate segments.
4. The method of claim 3 wherein the number of segments of the brush seal is four.
5. The method of claim 4 including the step of chamfering the ends of each of the segments and assembling the segments to form a ring with a uniform cross section.

* * * * *